(12) United States Patent
Kim et al.

(10) Patent No.: US 11,581,575 B2
(45) Date of Patent: Feb. 14, 2023

(54) ALL-SOLID-STATE BATTERY COMPRISING ELECTROLYTE LAYER HAVING RECESS PATTERN

(71) Applicants: Hyundai Motor Company, Seoul (KR); Kia Motors Corporation, Seoul (KR)

(72) Inventors: Yun Sung Kim, Seoul (KR); A Reum Ha, Ulsan (KR); Sung Woo Noh, Seoul (KR); In Woo Song, Gyeonggi-do (KR); Yong Seok Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 259 days.

(21) Appl. No.: 17/117,275

(22) Filed: Dec. 10, 2020

(65) Prior Publication Data

US 2021/0399336 A1 Dec. 23, 2021

(30) Foreign Application Priority Data

Jun. 17, 2020 (KR) .................. 10-2020-0073672

(51) Int. Cl.
*H01M 10/0562* (2010.01)
*H01M 10/0525* (2010.01)
*H01M 10/0565* (2010.01)

(52) U.S. Cl.
CPC ... *H01M 10/0562* (2013.01); *H01M 10/0525* (2013.01); *H01M 10/0565* (2013.01); *H01M 2220/20* (2013.01); *H01M 2300/0077* (2013.01); *H01M 2300/0082* (2013.01)

(58) Field of Classification Search
None
See application file for complete search history.

(56) References Cited

U.S. PATENT DOCUMENTS

2019/0044186 A1* 2/2019 Kim ................. H01M 10/0525
2021/0057776 A1* 2/2021 Lu ...................... H01M 10/058

FOREIGN PATENT DOCUMENTS

KR 10-2019-0083877 A 7/2019

* cited by examiner

*Primary Examiner* — Christopher P Domone
(74) *Attorney, Agent, or Firm* — Fox Rothschild LLP (57) ABSTRACT

Disclosed is an anodeless-type all-solid-state battery. The all-solid-state battery includes a plurality of recesses formed in an electrolyte layer and to be depressed from a surface of the electrolyte layer contacting an anode collector and thus serve as spaces for lithium to reversibly precipitate.

15 Claims, 6 Drawing Sheets

ALL-SOLID-STATE BATTERY COMPRISING ELECTROLYTE LAYER HAVING RECESS PATTERN

CROSS REFERENCE TO RELATED APPLICATION

The present application claims priority based on Korean Patent Application No. 10-2020-0073672, filed on Jun. 17, 2020, the entire content of which is incorporated herein for all purposes by this reference.

TECHNICAL FIELD

The present invention relates to an anodeless-type all-solid-state battery. The all-solid-state battery may include therein a plurality of recesses, which are formed to be depressed from one surface of an electrolyte layer and thus serve as spaces for lithium to reversibly precipitate.

BACKGROUND OF THE INVENTION

Rechargeable secondary batteries have been used not only for small-sized electronic devices such as mobile phones, laptop computers and the like but also for large-sized transport vehicles such as hybrid vehicles, electric vehicles and the like. Accordingly, there is a need to develop secondary batteries having higher stability and energy density.

Conventional secondary batteries are mostly configured such that cells are formed using an organic solvent (organic liquid electrolyte), and thus limitations are imposed on the extent to which the stability and energy density thereof may be improved.

Meanwhile, an all-solid-state battery using an inorganic solid electrolyte without using an organic solvent has been receiving great attention these days and thus a cell may be manufactured in a safer and simpler manner.

However, the all-solid-state battery is problematic in that the energy density and power output performance thereof are inferior to those of conventional lithium-ion batteries using a liquid electrolyte. With the goal of solving the above problem, thorough research into improving the electrodes of all-solid-state batteries is ongoing.

In particular, the anode for an all-solid-state battery is mostly formed of graphite. In this case, in order to ensure ionic conductivity, an excess of a solid electrolyte, having a large specific gravity, is added along with the graphite, and thus the energy density per unit weight is very low compared to lithium-ion batteries. Moreover, when lithium metal is used for the anode, there are technical limitations in terms of price competitiveness and large-scale implementation.

Thorough research is currently ongoing into all-solid-state batteries having high energy density, one of which is an anodeless-type all-solid-state battery. The anodeless-type all-solid-state battery is a battery in which lithium is precipitated on an anode current collector instead of using an anode active material such as graphite or lithium metal.

However, the conventional anodeless-type all-solid-state battery has a limitation in that the utilization of lithium is low due to, for example, lithium being unevenly grown in dendritic phase or isolated in the form of moss. Moreover, there is not enough space for lithium to precipitate between the electrolyte layer and the anode current collector, and thus lithium is unevenly precipitated, and there is also a problem in that the dissociation reaction of lithium occurs non-uniformly because the pressure applied by the precipitated lithium varies in a position-dependent manner.

SUMMARY OF THE INVENTION

In preferred aspects, provided is an anodeless-type all-solid-state battery capable of uniformly precipitating lithium upon charging.

The term "anodeless-type all-solid-state battery" as used herein refers to an all-solid state battery that lacks a compatible, parallel and/or structural similar looking component of the counter electrode of a cathode, i.e. anode. Rather the anodeless-type all-solid battery may include a functional component that similarly or equivalently serves as a conventional anode. In certain embodiments, the anode current collector layer may be used as the counter electrode of the cathode in the anodeless-type all-solid battery without including an anode layer (e.g., lacking anode active material layer or lithium layer) and form non-matching or non-symmetric structure to the cathode.

The objectives of the present invention are not limited to the foregoing, and will be able to be clearly understood through the following description and to be realized by the means described in the claims and combinations thereof.

In an aspect, provided is an all-solid-state battery including an anode current collector layer, an electrolyte layer disposed on the anode current collector layer and including a solid electrolyte, and a composite cathode layer disposed on the electrolyte layer.

In particular, the electrolyte layer may include i) a plurality of recesses that are formed to be depressed to a predetermined depth and width from a surface of the electrolyte layer contacting the anode current collector layer and thus serve as spaces for storing lithium, ii) a first coating part applied on the inner surface of each of the recesses and including an oxide compound, and ii) a second coating part applied on the first coating part and including an electrically conductive material.

The electrolyte layer may have a pattern in which the recesses are regularly or irregularly arranged.

The recesses may be formed to be depressed so as to have walls thereof oriented at a right angle or a predetermined angle other than a right angle from the surface of the electrolyte layer.

The ratio (W/H) of depth (H) to width (W) of the recesses may be about 0.5 to 50.

The depth (H) of the recesses may suitably be about 30 μm to 200 μm.

The distance (L) between any one recess and another recess adjacent thereto may suitably be about 5 μm to 50 μm.

The oxide compound may suitably include aluminum oxide ($Al_2O_3$), zirconium oxide ($ZrO_2$) and combinations thereof.

The first coating part may suitably have a thickness of about 0.1 nm to 1 μm.

The electrically conductive material may suitably include one or more selected from the group consisting of carbon black, carbon nanotubes, graphite, gold, silver, copper, nickel, platinum, molybdenum, tungsten, and stainless steel.

The second coating part may suitably have a thickness of about 0.1 nm to 10 μm.

During charging of the all-solid-state battery, lithium may precipitate on the second coating part.

The electrolyte layer may further include a polymer material that is loaded in spaces formed by the recesses.

The polymer material may include one or more selected from the group consisting of polyethylene oxide, polyacrylonitrile, polymethyl methacrylate, polyvinylidene fluoride, and polyethylene terephthalate.

During charging of the all-solid-state battery, lithium may precipitate between the second coating part and the polymer material.

Further provided is a vehicle including the all-solid-state battery described herein.

According to various exemplary embodiments of the present invention, an all-solid-state battery does not include an anode active material layer, thus reducing the weight of the battery and greatly increasing the energy density per unit weight thereof. Moreover, since lithium can be uniformly precipitated in the recesses in the electrolyte layer, the formation of lithium dendrites and dead lithium can be suppressed. Further, since it is possible to precipitate and grow lithium in recesses, which are a kind of empty space, the pressure from the lithium can be uniformly applied to the interface between the anode current collector layer and the electrolyte layer.

The effects of the present invention are not limited to the foregoing, and should be understood to include all effects that can be reasonably anticipated from the following description.

Other aspects of the invention are disclosed infra.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Figure 1:
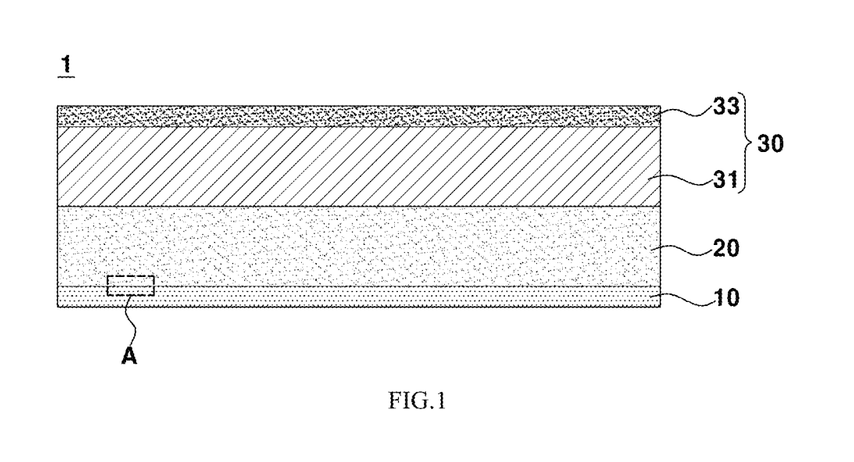
FIG. 1 shows an exemplary all-solid-state battery according to an exemplary embodiment of the present invention.

FIG. 1 shows an exemplary all-solid-state battery according to an exemplary embodiment of the present invention. The all-solid-state battery 1 includes an anode current collector layer 10, an electrolyte layer 20 disposed on the anode current collector layer 10, and a composite cathode layer 30 disposed on the electrolyte layer 20.

The anode current collector layer 10 may be formed in a sheet-like or planar substrate.

The anode current collector layer 10 may be a metal thin film including a metal selected from the group consisting of copper (Cu), nickel (Ni) and combinations thereof. Particularly, the anode current collector layer 10 may be a high-density metal thin film having a porosity of less than about 1%.

The anode current collector layer 10 may have a thickness of about 1 μm to 20 μm, and particularly about 5 μm to 15 μm.

The electrolyte layer 20 may include a solid electrolyte having lithium ionic conductivity.

The electrolyte layer 20 may include an oxide solid electrolyte or a sulfide solid electrolyte. The use of a sulfide solid electrolyte having high lithium ionic conductivity is preferable. The sulfide solid electrolyte is not particularly limited, but may include $Li_2S-P_2S_5$, $Li_2S-P_2S_5-LiCl$, $Li_2S-P_2S_5-LiBr$, $Li_2S-P_2S_5-Li_2O$, $Li_2S-SiS_2$, $Li_2S-SiS_2-LiBr$, $Li_2S-SiS_2-LiCl$, $Li_2S-SiS_2-B_2S_3-LiI$, $Li_2S-B_2S_3$, $Li_2S-P_2S_5-Z_mS_n$ (in which m and n are positive numbers, and Z is any one of Ge, Zn and Ga), $Li_2S-GeS_2$, $Li_2S-SiS_2-Li_3PO_4$, $Li_2S-SiS_2-Li_xMO_y$ (in which x and y are positive numbers, and M is any one of P, Si, Ge, B, Al, Ga and In), $Li_{10}GeP_2S_{12}$, and the like.

The solid electrolyte layer may have lithium ionic conductivity of about $1\times10^{-4}$ S/cm or greater, and the particle size (D50) thereof may be about 0.1 μm to 10 μm.

Figure 2:
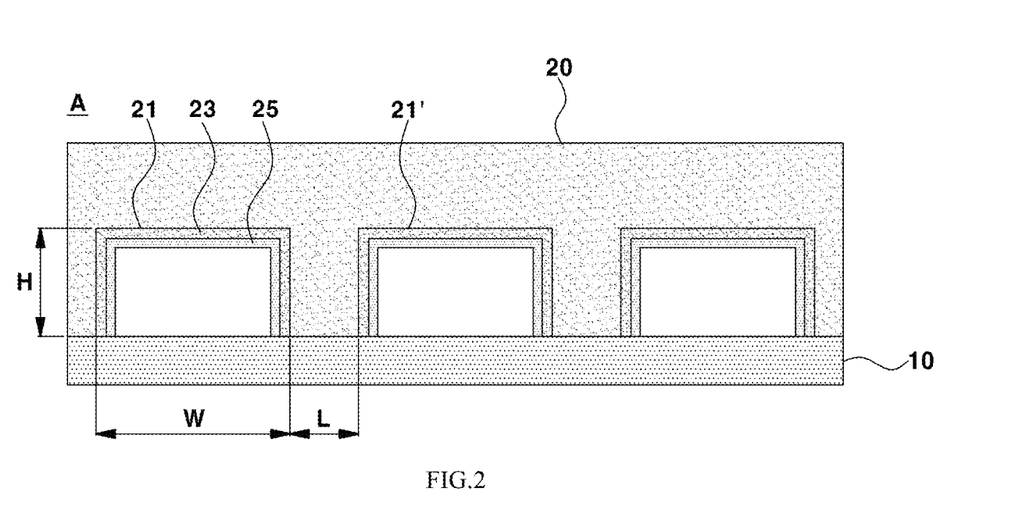
FIG. 2 shows an enlarged view of the interface A between the anode current collector layer and the electrolyte layer of FIG. 1 according to an exemplary embodiment of the present invention.

FIG. 2 shows an enlarged view of the interface A between the anode current collector layer 10 and the electrolyte layer 20 of FIG. 1. The electrolyte layer 20 may include a plurality of recesses 21, which are formed to be depressed to a predetermined depth and width from one surface of the anode current collector layer 10, a first coating part 23 applied on the inner surface of each of the recesses 21, and a second coating part 25 applied on the first coating part 23.

The recesses 21 may provide spaces for precipitation and growth of lithium ions, which are generated from the composite cathode layer 30 and thus move through the electrolyte layer 20, during charging of the all-solid-state battery 1.

The electrolyte layer 20 may have a pattern in which the recesses 21 are regularly or irregularly arranged. "Regular pattern" means that the recesses 21 are formed at a constant interval. The recesses 21 may have the same shape or different shapes. On the other hand, "irregular pattern" means that the recesses 21 are unevenly formed, rather than being formed at a constant interval. For example, the recesses 21 may have the same shape or different shapes. According to various exemplary embodiments of the present invention, lithium may precipitate and grow in the recesses 21 to thus equalize the pressure by the lithium applied to the interface between the electrolyte layer 20 and the anode current collector layer 10. To this end, the formation of a pattern in which the recesses 21 may be regularly arranged.

Figure 3:
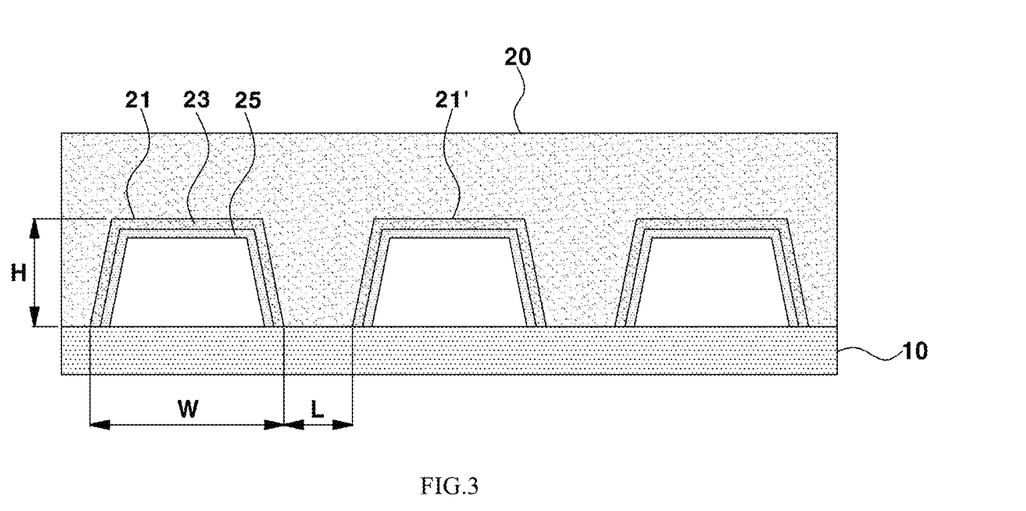
FIG. 3 shows recesses, which are formed to be depressed such that walls thereof are oriented obliquely at a predetermined angle other than a right angle, according to an exemplary embodiment of the present invention.
Figure 4:
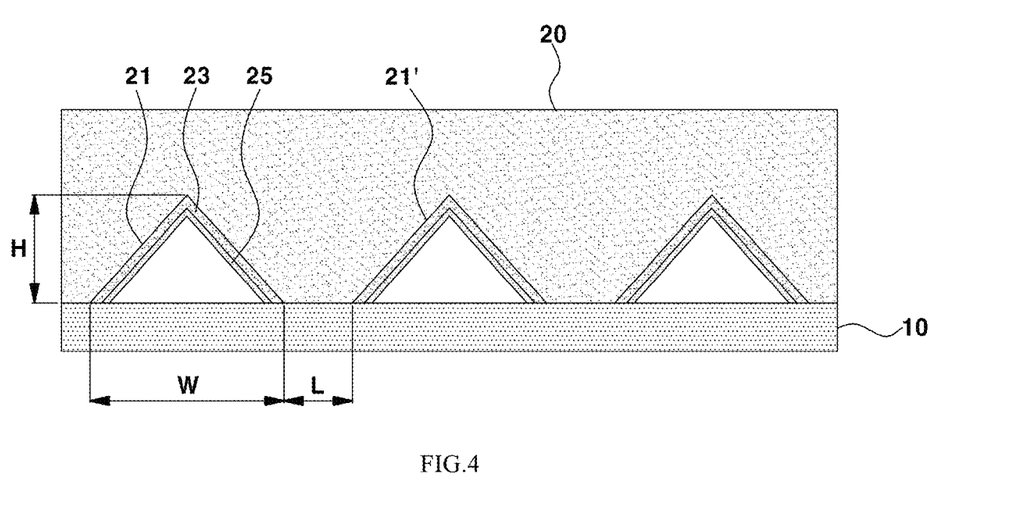
FIG. 4 shows recesses, which are formed to be depressed such that walls thereof are oriented obliquely at a predetermined angle other than a right angle, according to an exemplary embodiment of the present invention.

The recesses 21 may be formed to be depressed so as to have walls thereof oriented at a right angle or a predetermined angle other than a right angle from one surface of the electrolyte layer 20. FIG. 2 shows the recesses 21 formed to be depressed so as to have walls thereof oriented at a right angle. FIGS. 3 and 4 show the recesses 21 formed to be depressed such that walls thereof are oriented obliquely at a predetermined angle other than a right angle.

In FIGS. 2 to 4, the portions of the recesses 21 that are depressed from one surface of the electrolyte layer 20 are shown in a straight line, which serves to promote a clearer understanding of the characteristics of the present invention, and the recesses 21 of the present invention should not be interpreted as being limited to the shapes shown in FIGS. 2 to 4. The depressed surface of the recesses 21 (hereinafter referred to as a 'side surface') may be a straight line and/or a curved line when viewed in cross section. When the side surface of the recesses 21 has the appearance of a curved line, the recesses 21 are formed to be depressed at an angle defined by a tangent line at the end of the curved line and one surface of the electrolyte layer 20.

Also, the three-dimensional shape of the recesses 21 is not particularly limited, and may be, for example, a cylindrical shape, a horn shape, or a hemispherical shape.

The ratio (W/H) of the depth (H) to the width (W) of the recesses 21 may be about 0.5 to 50, about 1 to 50, or about 1 to 25. Here, the depth (H) means the length that the recesses 21 are depressed from one surface of the electrolyte layer 20. Also, the width (W) means the longest distance between any one point where the side surface of the recesses 21 and one surface of the electrolyte layer 20 meet and another point. When the ratio (W/H) thereof is less than about 0.5, at the initial stage of charging, lithium may be intensively deposited on the protruding portions that facilitate the movement of lithium ions, and thus the recesses 21 may collapse due to the force applied to the protruding portions. On the other hand, when the ratio thereof is greater than about 50, the distance between the wall surface of the recesses 21 in which the deposition and dissociation of lithium begins and the center of the recesses 21 may increase, so lithium that is not reversibly dissociated may remain.

The depth (H) of the recesses 21 may be about 30 μm to 200 μm. When the depth (H) thereof is less than about 30 μm, there may be insufficient space to receive the precipitated lithium. On the other hand, when the depth thereof is greater than about 200 μm, the movement of electrons from the anode current collector may be impeded.

The width (W) of the recesses 21 may be about 25 μm to 2 mm. When the width (W) thereof is less than about 25 μm, there may be insufficient space to receive the precipitated lithium. On the other hand, when the width thereof is greater than about 2 mm, lithium that is not reversibly dissociated may remain in the center of the recesses 21.

When the pattern in which the recesses 21 are regularly arranged at a constant interval is formed, the distance (L) between any one recess 21 and another recess 21' adjacent thereto may be about 5 μm to 50 μm. The distance (L) means the shortest distance between any one point where the side surface of any one recess 21 and one surface of the electrolyte layer 20 meet and another point where the side surface of another recess 21' and one surface of the electrolyte layer 20 meet.

The process of forming the recesses 21 is not particularly limited, and may include, for example, forming a pattern by pressing a ceramic or metal substrate having an embossed or engraved pattern on one surface of the electrolyte layer 20, or forming a pattern by irradiating the electrolyte layer 20 with a laser or the like.

The first coating part 23 is configured to uniformly precipitate lithium in the recesses 21. Also, the first coating part 23 may function as a kind of protective film that suppresses the reaction between the solid electrolyte of the electrolyte layer 20 and the precipitated lithium.

The first coating part 23 may include an oxide compound. For example, the first coating part 23 may include at least one selected from the group consisting of aluminum oxide ($Al_2O_3$), zirconium oxide ($ZrO_2$) and combinations thereof.

Since the first coating part 23 has a property of forming a seed of lithium having a low contact angle, lithium may grow horizontally along the first coating part 23. Consequently, lithium may uniformly precipitate in the recesses 21.

The thickness of the first coating part 23 may be about 0.1 nm to 1 μm. When the thickness thereof is less than about 0.1 nm, it may be difficult to obtain desired effects. On the other hand, when the thickness thereof is greater than about 1 μm, the movement of lithium ions may be impeded.

The process of forming the first coating part 23 is not particularly limited, and examples thereof may include atomic layer deposition (ALD), physical vapor deposition (PVD), chemical vapor deposition (CVD), spray coating, and the like.

The second coating part 25 is configured to move electrons. During charging of the all-solid-state battery 1, lithium ions that have passed through the electrolyte layer 20 and the first coating part 23 and electrons that have passed through the anode current collector layer 10 and the second coating part 25 react with each other, so lithium may be precipitated on the second coating part 25.

The second coating part 25 may include an electrically conductive material. For example, the second coating part 25 may include one or more selected from the group consisting of carbon black, carbon nanotubes, graphite, gold, silver, copper, nickel, platinum, molybdenum, tungsten, and stainless steel.

The thickness of the second coating part 25 may be 0.1 nm to 10 μm. When the thickness thereof is less than about 0.1 nm, the movement of electrons may be impeded. On the other hand, when the thickness thereof is greater than about 10 μm, coating processability may deteriorate, and the amount of space in the recesses 21 is limited, and thus the effects thereof may be suppressed.

The process of forming the second coating part 25 is not particularly limited, and examples thereof may include atomic layer deposition (ALD), physical vapor deposition (PVD), chemical vapor deposition (CVD), spray coating, and the like.

Figure 5:
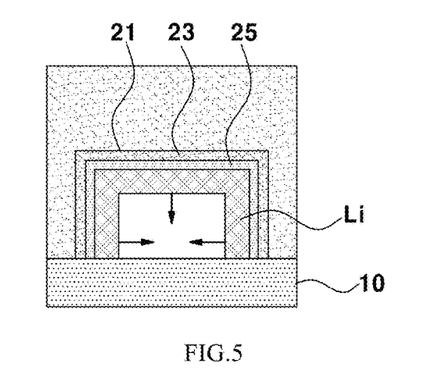
FIG. 5 shows precipitation of lithium in spaces formed by the recesses during charging of an exemplary all-solid-state battery according to an exemplary embodiment of the present invention.

FIG. 5 is a reference view showing the precipitation of lithium (Li) in the spaces formed by the recesses 21 during charging of the all-solid-state battery.

For example, lithium (Li) is uniformly precipitated along the second coating part 25, and the precipitated lithium (Li) grows in a direction parallel to and crossing the anode current collector layer 10. Since the seed of lithium having a low contact angle is formed by the first coating part 23, lithium (Li) may mainly grow toward the center of the recesses 21 along the surface of the walls of the recesses 21. Briefly, lithium (Li) may be grown in a direction parallel to the anode current collector layer 10. Consequently, according to various exemplary embodiment of the present invention, the rate of growth of lithium dendrites may decrease in the direction of lamination of the electrolyte layer 20, the composite cathode layer 30, and the like, so short-circuiting of the all-solid-state battery may be suppressed.

Figure 6:
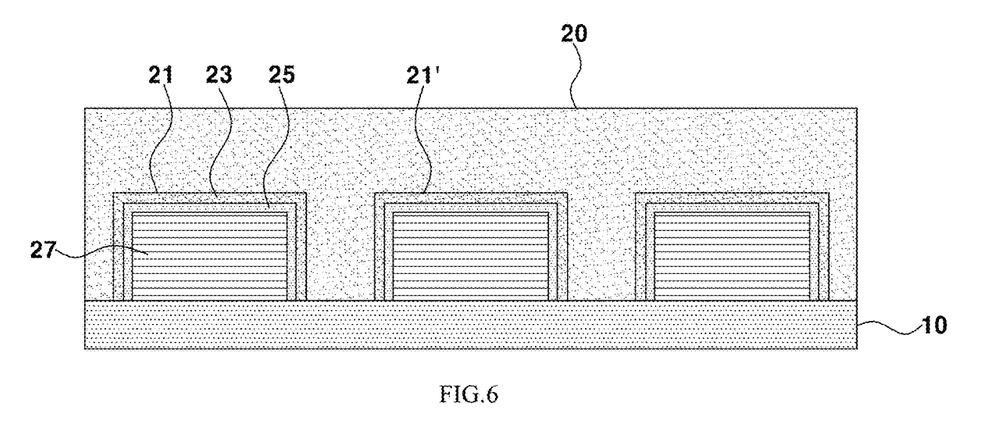
FIG. 6 shows an exemplary electrolyte layer according to an exemplary embodiment of the present invention.

FIG. 6 shows another illustration of the electrolyte layer 20 according to the present invention. For example, the electrolyte layer 20 may include a polymer material 27 that is loaded in the spaces formed by the recesses 21.

Figure 7:
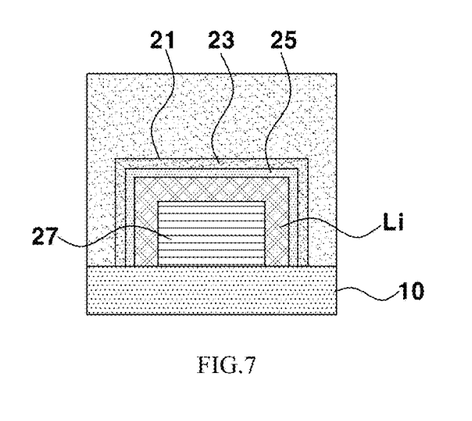
FIG. 7 shows precipitation of lithium in spaces formed by the recesses of FIG. 6 during charging of the all-solid-state battery.

FIG. 7 is a reference view showing the precipitation of lithium (Li) in the spaces formed by the recesses 21 of FIG. 6 during charging of the all-solid-state battery.

During charging of the all-solid-state battery, lithium (Li) is precipitated between the second coating part 25 and the polymer material 27. Since the polymer material 27 is an elastic material, when lithium (Li) is precipitated and dissociated, the structure of the recesses 21, the joining relationship between the electrolyte layer 20 and the anode current collector layer 10 and the like may be maintained.

The polymer material 27 may include one or more selected from the group consisting of polyethylene oxide, polyacrylonitrile, polymethyl methacrylate, polyvinylidene fluoride, and polyethylene terephthalate.

The composite cathode layer 30 may include a cathode active material layer 31 provided on the electrolyte layer 20 and a cathode current collector layer 33 provided on the cathode active material layer 31.

The cathode active material layer 31 may include a cathode active material, a solid electrolyte, a conductive material, a binder, etc.

The cathode active material may be an oxide active material or a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ or the like, a spinel-type active material such as $LiMn_2O_4$, $Li(Ni_{0.5}Mn_{1.5})O_4$ or the like, an inverse-spinel-type active material such as $LiNiVO_4$, $LiCoVO_4$ or the like, an olivine-type active material such as $LiFePO_4$, $LiMnPO_4$, $LiCoPO_4$, $LiNiPO_4$ or the like, a silicon-containing active material such as $Li_2FeSiO_4$, $Li_2MnSiO_4$ or the like, a rock-salt-layer-type active material in which a portion of a transition metal is substituted with a different metal, such as $LiNi_{0.8}Co_{(0.2-x)}Al_xO_2$ (0<x<0.2), a spinel-type active material in which a portion of a transition metal is substituted with a different metal, such as $Li_{1+x}Mn_{2-x-y}M_yO_4$ (M being at least one of Al, Mg, Co, Fe, Ni and Zn, 0<x+y<2), or lithium titanate such as $Li_4Ti_5O_{12}$ or the like.

The sulfide active material may be copper chevrel, iron sulfide, cobalt sulfide, nickel sulfide, etc.

The solid electrolyte may be an oxide solid electrolyte or a sulfide solid electrolyte. Here, the use of a sulfide solid electrolyte having high lithium ionic conductivity is preferable. The sulfide solid electrolyte is not particularly limited, but may include $Li_2S$—$P_2S_5$, $Li_2S$—$P_2S_5$—LiCl, $Li_2S$—$P_2S_5$—LiBr, $Li_2S$—$P_2S_5$—$Li_2O$, $Li_2S$—$SiS_2$, $Li_2S$—$SiS_2$—LiBr, $Li_2S$—$SiS_2$—LiCl, $Li_2S$—$B_2S_3$, $Li_2S$—$P_2S_5$—$Z_mS_n$ (in which m and n are positive numbers, and Z is any one of Ge, Zn and Ga), $Li_2S$—$GeS_2$, $Li_2S$—$SiS_2$—$Li_3PO_4$, $Li_2S$—$SiS_2$—$Li_xMO_y$ (in which x and y are positive numbers, and M is any one of P, Si, Ge, B, Al, Ga and In), $Li_{10}GeP_2S_{12}$, or the like. The solid electrolyte may be the same as or different from that included in the electrolyte layer 20.

The conductive material may suitably include carbon black, conductive graphite, ethylene black, graphene, or the like.

The binder may suitably include BR (butadiene rubber), NBR (nitrile butadiene rubber), HNBR (hydrogenated nitrile butadiene rubber), PVDF (polyvinylidene difluoride), PTFE (polytetrafluoroethylene), CMC (carboxymethylcellulose), or the like.

The cathode current collector layer 33 may suitably include an aluminum foil or the like.

EXAMPLE

A better understanding of the present invention will be given through the following examples, which are merely set forth to illustrate the present invention but are not to be construed as limiting the scope of the present invention.

Examples 1 and 2

An aluminum foil, serving as a cathode current collector layer, was coated with a cathode slurry to afford a cathode active material layer. The cathode slurry was prepared using NCM as the cathode active material, carbon black as the conductive material, LPS-based solid electrolyte as the solid electrolyte, and butadiene rubber as the binder.

An electrolyte layer was formed by applying the LPS-based solid electrolyte on the composite cathode layer prepared described as above. A ceramic substrate having an embossed pattern having a cylindrical shape was placed and pressed on the electrolyte layer, thus forming recesses. In Example 1, the recesses had a depth (H) of 70 μm and a width (W) of 150 μm, and in Example 2, the recesses had a depth (H) of 70 μm and a width (W) of 80 μm.

The ceramic substrate was removed, and aluminum oxide ($Al_2O_3$) was applied on the inner surface of the recesses through atomic layer deposition, thus forming a first coating part.

A second coating part was formed by coating the first coating part with gold (Au) using sputtering.

Nickel foam as an anode current collector layer was laminated on the electrolyte layer, thereby completing an all-solid-state battery.

Comparative Example

An all-solid-state battery was manufactured in the same manner as in Examples 1 and 2, with the exception that recesses were not formed in the electrolyte layer.

Test Example 1—Analysis with Scanning Electron Microscope (SEM)

Figure 8:
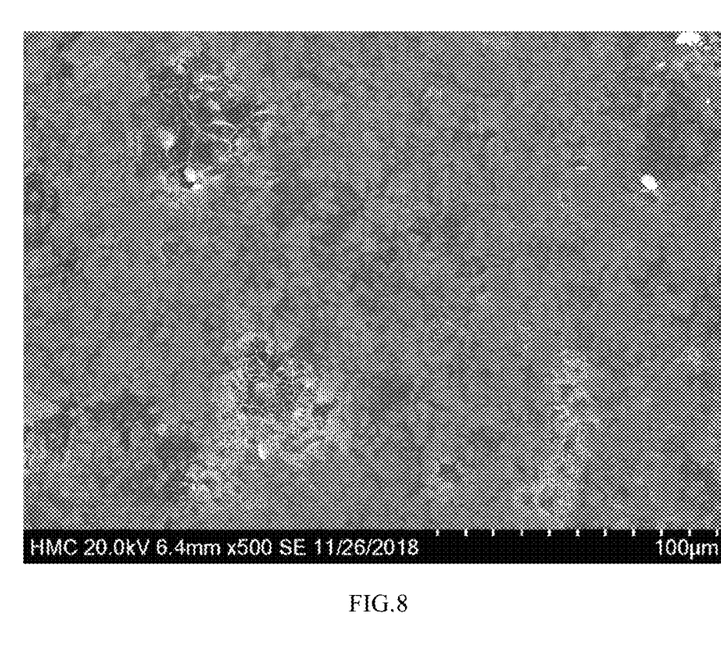
FIG. 8 shows the results of analysis of the all-solid-state battery of Example 1 according to an exemplary embodiment of the present invention using a scanning electron microscope.

The all-solid-state battery of Example 1 was observed using a scanning electron microscope. The results thereof are shown in FIG. 8. FIG. 8 shows the results of observation of the recesses in the electrolyte layer after charging the all-solid-state battery and lithium (bright) precipitated in the recesses (dark).

Test Example 2—Analysis of Capacity of all-Solid-State Battery

Figure 9:
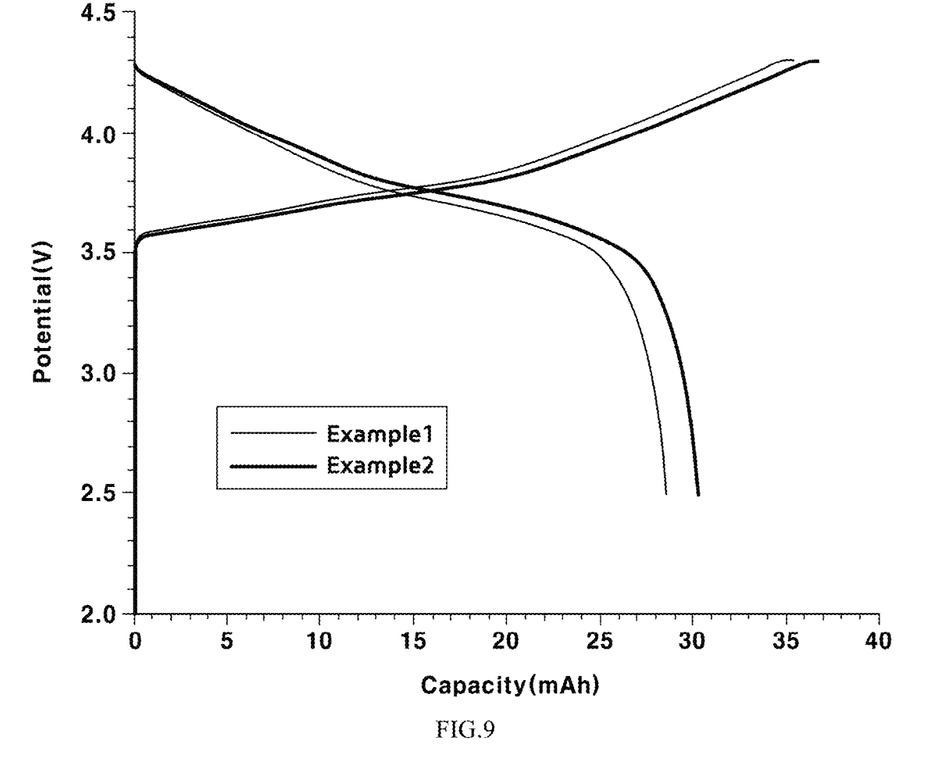
FIG. 9 shows the results of measurement of the capacity of the all-solid-state batteries of Examples 1 and 2 according to exemplary embodiments of the present invention.

The capacity of the all-solid-state batteries of Examples 1 and 2 was measured. The results thereof are shown in FIG. 9 and the all-solid-state batteries of Examples 1 and 2 exhibited satisfactory capacity of 25 mAh or greater.

Test Example 3—Analysis of Lifetime of all-Solid-State Battery

Figure 10:
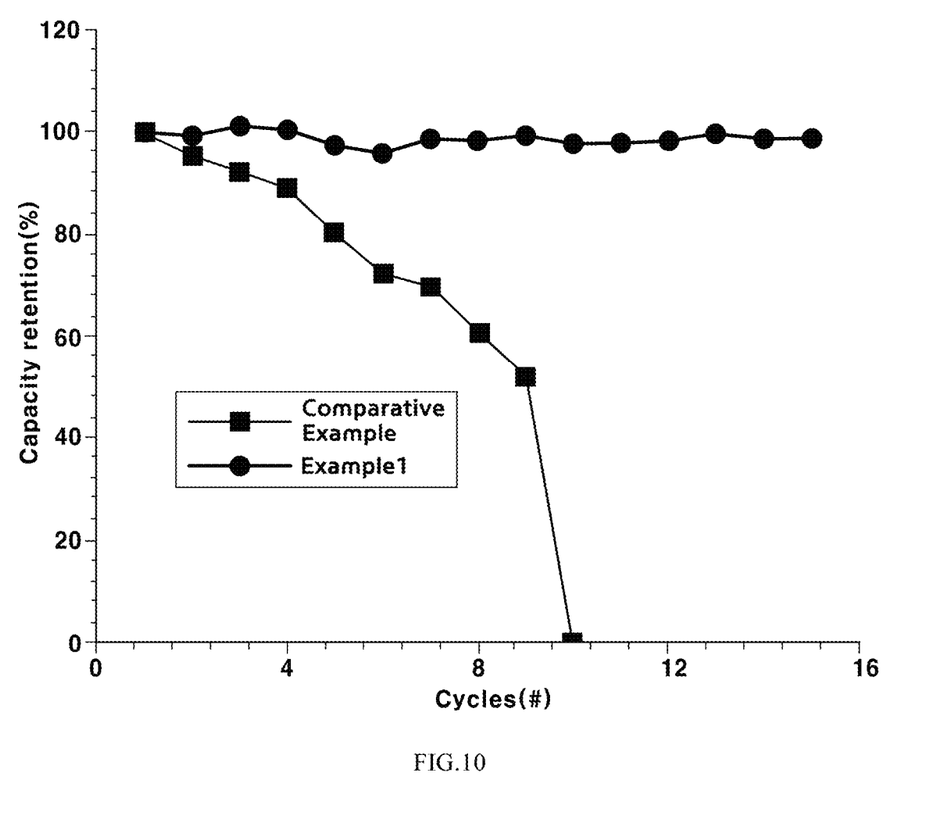
FIG. 10 shows the results of measurement of the lifetime of exemplary all-solid-state batteries of Example 1 according to an exemplary embodiment of the present invention and Comparative Example.

The lifetime of the all-solid-state batteries of Example 1 and Comparative Example was measured. The results thereof are shown in FIG. 10. The capacity of the all-solid-state battery of Example 1 was maintained without change even after 16 charge/discharge cycles. In Comparative Example, however, the capacity rapidly decreased during charge/discharge.

As described hereinbefore, the present invention has been described in detail with respect to test examples and embodiments. However, the scope of the present invention is not limited to the aforementioned test examples and examples, and various modifications and improved modes of the present invention using the basic concept of the present invention defined in the accompanying claims are also incorporated in the scope of the present invention.

What is claimed is:

1. An all-solid-state battery, comprising:
an anode current collector layer;
an electrolyte layer disposed on the anode current collector layer and comprising a solid electrolyte; and
a composite cathode layer disposed on the electrolyte layer,
wherein the electrolyte layer comprises i) a plurality of recesses, which are formed to be depressed to a depth and width from a surface of the electrolyte layer contacting the anode current collector layer and thus serve as spaces for storing lithium, ii) a first coating part applied on a surface of each of the recesses and comprising an oxide compound, and iii) a second coating part applied on the first coating part and comprising an electrically conductive material.

2. The all-solid-state battery of claim 1, wherein the electrolyte layer has a pattern in which the recesses are regularly or irregularly arranged.

3. The all-solid-state battery of claim 1, wherein the recesses are formed to be depressed so as to have walls thereof oriented at a right angle or a predetermined angle other than a right angle from the surface of the electrolyte layer.

4. The all-solid-state battery of claim 1, wherein a ratio (W/H) of a depth (H) to a width (W) of the recesses is about 0.5 to 50.

5. The all-solid-state battery of claim 1, wherein a depth (H) of the recesses is about 30 μm to 200 μm.

6. The all-solid-state battery of claim 1, wherein a distance (L) between any one recess and another recess adjacent thereto is about 5 μm to 50 μm.

7. The all-solid-state battery of claim 1, wherein the oxide compound comprises aluminum oxide ($Al_2O_3$), zirconium oxide ($ZrO_2$), or combinations thereof.

8. The all-solid-state battery of claim 1, wherein the first coating part has a thickness of about 0.1 nm to 1 μm.

9. The all-solid-state battery of claim 1, wherein the electrically conductive material comprises one or more selected from the group consisting of carbon black, carbon nanotubes, graphite, gold, silver, copper, nickel, platinum, molybdenum, tungsten, and stainless steel.

10. The all-solid-state battery of claim 1, wherein the second coating part has a thickness of about 0.1 nm to 10 μm.

11. The all-solid-state battery of claim 1, wherein lithium is precipitated on the second coating part during charging of the all-solid-state battery.

12. The all-solid-state battery of claim 1, wherein the electrolyte layer further comprises a polymer material that is loaded in spaces formed by the recesses.

13. The all-solid-state battery of claim 12, wherein the polymer material comprises one selected from the group consisting of polyethylene oxide, polyacrylonitrile, polymethyl methacrylate, polyvinylidene fluoride, and polyethylene terephthalate.

14. The all-solid-state battery of claim 12, wherein lithium is precipitated between the second coating part and the polymer material during charging of the all-solid-state battery.

15. A vehicle comprising an all-solid-state battery of claim 1.

* * * * *